Automatic Focusing." Vol. 15, No. 2, July 1972.

United States Patent

Kiyohara et al.

[11] 3,827,064
[45] July 30, 1974

[54] FOCUS DETECTOR DEVICE

[75] Inventors: Takehiko Kiyohara, Zama; Noritaka Mochizuki, Kamakura, both of Japan

[73] Assignee: Canon Kabushiki Kaisha, Tokyo, Japan

[22] Filed: Jan. 22, 1973

[21] Appl. No.: 325,813

[30] Foreign Application Priority Data
Jan. 26, 1972  Japan................................ 47-9677

[52] U.S. Cl....................... 354/25, 354/40, 354/42, 354/272
[51] Int. Cl. ............................................. G03b 3/00
[58] Field of Search.............. 95/42, 44 R, 44 C, 45, 95/10 CD, 10 C, 64 B, 64 A, 10 CE

[56] References Cited
UNITED STATES PATENTS

| | | | |
|---|---|---|---|
| 3,385,190 | 5/1968 | Sho et al................................ | 95/42 |
| 3,504,610 | 4/1970 | Donity ................................ | 95/44 R |
| 3,532,043 | 10/1970 | Shimomura............................ | 95/42 |
| 3,605,596 | 9/1971 | Vockenhuber et al. ............. | 95/44 R |
| 3,611,895 | 10/1971 | von Albedyll...................... | 95/10 CD |
| 3,618,499 | 11/1971 | Harvey............................ | 95/44 C X |
| 3,678,835 | 7/1972 | Takishima........................... | 95/45 X |
| 3,691,922 | 9/1972 | Konig et al.......................... | 95/44 R |

OTHER PUBLICATIONS
IBM Technical Disclosure Bulletin, "Optical Surface .

*Primary Examiner*—Joseph F. Peters, Jr.
*Assistant Examiner*—E. M. Bero
*Attorney, Agent, or Firm*—William R. Woodward, Flynn & Frishauf

[57] ABSTRACT

This specification discloses a focus detector device which utilizes the fact that when a target image is formed in focus on the surface of a photoelectric element such as CdS cell or the like through an objective lens the resistance of the photoelectric element is maximum and when the formed image is out of focus the resistance of the photoelectric element is decreased. At least one focusing light-receiving element is disposed in the optical path provided by the objective lens with a focusing lens interposed between the element and the objective lens. Means for limiting a light beam passed from the target or object of the photoelectric element is provided to control the amount of light so as to cause a predetermined brightness of the object light to be received by the photoelectric element. A second photoelectric element is provided to control the diaphragm of the objective lens and a second auxiliary diaphragm in front of the focusing phtotelectric element. The photoelectric element may be located either substantially conjugately with or forwardly and rearwardly of a secondary real image plane provided by the objective lens with respect to the focusing lens.

3 Claims, 4 Drawing Figures

FOCUS DETECTOR DEVICE

BACKGROUND OF THE INVENTION

1. Field of the Invention

This invention relates to a focus detector device, and more particularly to a focus detector device in a photographic camera.

2. Description of the Prior Art

A focus detector device is already known from U.S. Pat. No. 3,615,137 that utilizes the that when a target image is formed in focus on the surface of a photoelectric element, such as a CdS cell or the like, through an objective lens, the resistance of the photoelectric element, assumes an extreme value, e.g. maximum or minimum value, compared with the resistance of the photoelectric element 11 when the image is out of focus at the target. German Applications DAS 1,447,469, furthermore, discloses an automatic focusing system wherein two photoelectric elements are disposed at respective positions differently distant from the objective, so that the objective is adjusted in response to the difference between the outputs of the two photoelectric elements. That is a focal position determining device comprising two or more sets of devices, each of which comprises two photoelectric elements disposed at the positions containing forward and rearward image points, the two elements being connected with a differential circuit so that the differential output of the two elements resulting from the image formation by the objective lens may be indicated by an indicator. The two or more sets of devices in that apparatus are combined together in such a manner that the photoelectric elements in the respective sets are forward and rearward to each other, whereby the position of the target object may be determined by the combination of the indications provided by the indicators in the respective sets.

The present invention relates to improvements in the devices disclosed in the DAS 1,447,469 and U.S. Pat. No. 3,615,137.

SUMMARY OF THE INVENTION

It is a first object of the present invention to present a specific arrangement of the optical path for the focus detector device in a single lens reflex camera, and to provide means for simplifying the focus detecting mechanism based thereon.

It is a second object of the present invention to provide a focus detector device in which the in-focus or out-of-focus condition of an image, formed on a secondary image plane provided in addition to the surface of a photographic film, through a picture-taking lens, as is peculiar to a single lens reflex camera, may be sensed by a photoelectric element by using a generally used viewfinder system without greatly modifying it, and the detection signal of the photoelectric element may be converted into an electrical signal which operates a servo-mechanism to move the picture-taking lens axially with respect to the surface of the film to thereby automatically bring the lens into its in-focus position.

It is a third object of the present invention to provide a focus detector device in which the brightness of the secondary image plane provided in addition to the surface of the photographic film, through the picture-taking lens, as is peculiar to a single lens reflex camera, may be measured by a photoelectric element discretely provided in the optical path of the focus detector device and the output of such element is used to control the amount of light impinging on the focus detecting element.

It is a fourth object of the present invention to utilize the same photoelectric element in an open aperture photometry system to preset the aperture for being closed down just prior to shutter release and to control immediately the amount of light impinging on the focus detector. These objects may be achieved by improvements, combination and operation of various parts forming the present invention. Some specific embodiments of the present invention will be illustrated hereinafter in the following detailed description and the accompanying drawings.

DESCRIPTION OF THE PREFERRED EMBODIMENTS

Figure 1:
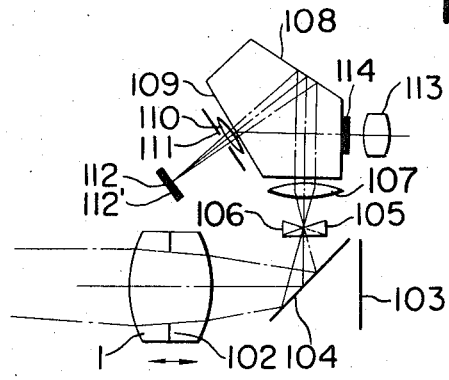
FIG. 1 is a schematic view showing the construction of the focus detector device according to a first embodiment of the present invention.
Figure 2:
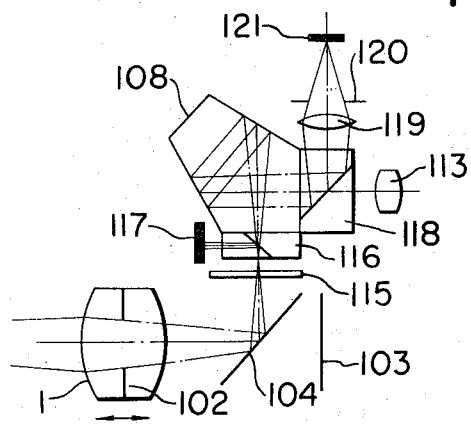
FIG. 2 is a schematic view showing the construction of the focus detector device according to a second embodiment of the present invention.

Referring to FIG. 1, an embodiment of the focus detector device according to the present invention comprises a picture-taking lens 1, an aperture mechanism 102, a photographic film 103, a mirror 104, prisms 105 and 106, relay lenses 107 and 110, a pentaprism 108, a variable opening stop 111, photoelectric elements 112 and 112', a magnifier lens 113, and a metering photoelectric element 114. The picture-taking lens 1 has the aperture mechanism 102 incorporated therein and is operatively associated with an exposure meter (not shown) to provide a proper amount of object light on the surface of the film 3. The mirror 104 serves to direct the light beam passed through the picture-taking lens 1 to the prisms 105 and 106 which are in conjugate relationship with the surface of the film 103. The light beam passed from the object through the picture-taking lens 1 reaches a secondary image plane which is made into conjugate relationship with the surface of the film 103 by the mirror 104, and the image incident on the secondary image plane is split into two images by the declination prisms 105 and 106 and then passed through the relay lens 107 into the pentaprism 108. Since the pentaprism 108 has a third reflecting surface 109 formed as a half-mirror, part of the light is passed through the reflecting surface 109 and further through the relay lens 110 to form an image on the photoelectric elements 112, 112'. The other part of the light which is reflected from the reflecting surface 109 is directed to the magnifier lens 113. The metering photoelectric element 114, disposed between the pentaprism 108 and the magnifier lens 113, receives the light reflected from the reflecting surface 109 aand measures the brightness of the secondary image plane to thereby produce a variable electrical output corresponding to the variable brightness of the secondary image plane. The increase or decrease in the electrical output drives an electrical drive means (not shown) to control the variable opening stop 111 so as to provide a substantially constant intensity of illumination on the surfaces of the photoelectric elements 112, 112', thereby maintaining the resistances of the photoelectric elements 112, 112' at a predetermined value. 6 Referring to a second embodiment of the focus detector device as shown in FIG. 2, a picture-taking lens 101, an aperture mechanism 102, a film surface 103 and a mirror 104 are identical in construction and arrangement to those in the first embodiment described with respect to FIG. 1, but with an exception that a transmissive diffusing plate 115 is disposed in the image plane conjugate with the film surface 103. Part of the light incident upon the diffusing plate 115 is partly split by a beam splitter 116 and directed to a metering element 117. The other part of the light which is passed through the lens splitter 116 enters into the pentaprism 108 and then is reflected by a second beam splitter 118 disposed between the pentaprism 108 and a magnifier lens 113, so that the reflected light further passes through a relay lens 119 and a variable opening stop 120 to a photoelectric element 121. The part of the light which is passed through the second beam splitter 118 is directed to the magnifier lens 113. The metering element 117 produces a variable electrical output corresponding to the variable brightness of the image on the dispersing plate 115. The increase or decrease in the variable electrical output drives an electrical drive means (not shown) to control the variable opening stop 120 so as to provide a substantially constant intensity of illumination on the element 117 to thereby maintain the resistance of the photoelectric element 121 substantially at a predetermined value, in accordance with the variation in quantity of light resulting from the variable brightness of the environment or from the use of a picture-taking lens 101 having a different focal length and a different full aperture value, or in accordance with the variation in quantity of light resulting from the stop-down of the aperture mechanism 102, or in accordance with the variation in quantity of light resulting from the use of a transmissive diffusing plate 115 having a different transmittivity.

Figure 3:
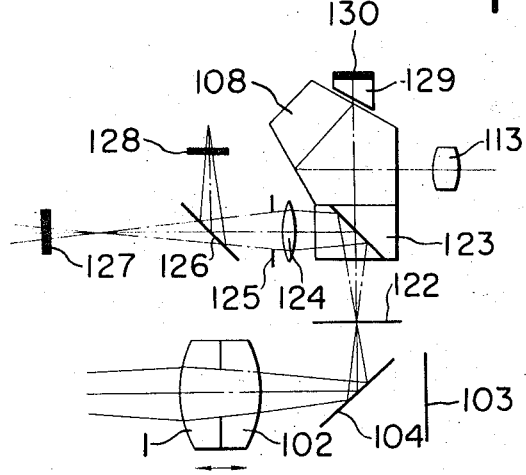
FIG. 3 is a schematic view showing tthe construction of the focus detector device according to a third embodiment of the present invention.

Referring to a third embodiment of the foucs detector device as shown in FIG. 3, an aperture mechanism 102, a film surface 103 and a mirror 104 are again identical in construction and arrangement to those in the first and second embodiments described with respect to FIGS. 1 and 2, but with an exception that the image formed on the secondary image plane 122 which is in conjugate relationship with the film surface 103 is directed to a relay lens 124 and to a variable opening stop 125 by a beam splitter 123. Such image is partly reflected by and partly passed through a half-mirror 126 to reach photoelectric elements 127 and 128, respectively. Since the photoelectric element 127 is disposed rearwardly of the focal point of the relay lens 124 with respect to the image plane 122 while the other photoelectric element 128 is disposed forwardly of the focal point of the relay lens 124, there is produced a differential output between the two photoelectric elements depending on the focused position of the picture-taking lens 101 and such output is used to control the focusing of the piicture-taking lens 101. Part of the light which is passed through the beam splitter 123 is further directed through a pentaprism 108 and a correction block 129 to a metering element 130, which produces a variable electrical output corresponding to the variable brightness of the image on the secondary image plane 122. The increase or decrease in the electrical output drives an electrical drive means (not shown) to control the variable opening stop 125 so as to maintain the resistances of the photoelectric elements 127 and 128 substantially at a predetermined value.

Figure 4:
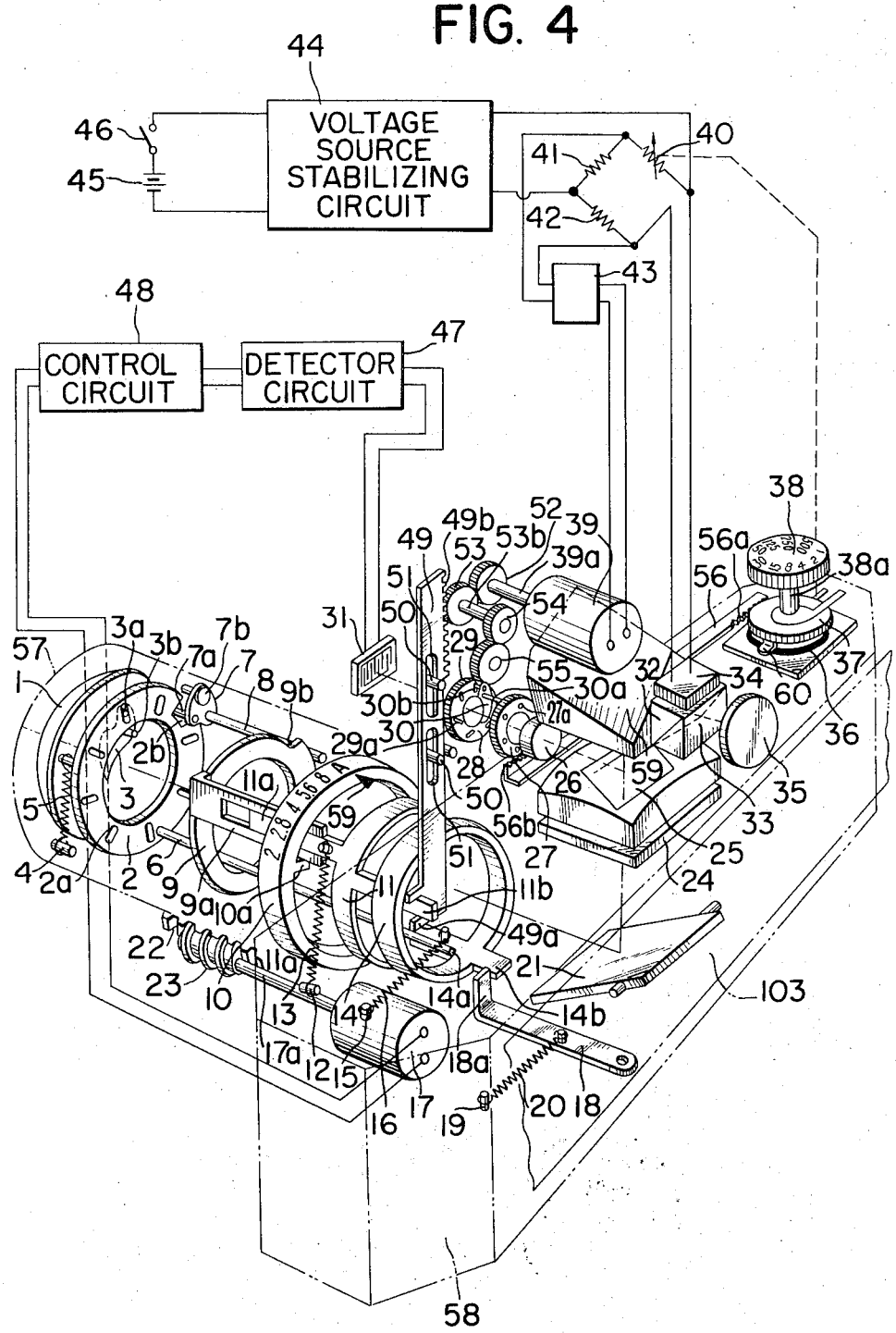
FIG. 4 is a schematic perspective view showing the essential portions of a single lens reflex camera having incorporated therein a fouth embodiment of the focus detector device according to the present invention.

FIG. 4 shows a specific example of the single lens reflex camera which has incorporated therein a fourth embodiment of the focus detector device according to the present invention.

A lens barrel 57 secured to a camera body 58 contains therein main elements such as picture-taking lens 1, aperture ring 2, aperture setting cam ring 9, manually operable aperture ring 10, aperture setting ring 11 and stop-down drive ring 14. A part of the barrel provides rack teeth 22.

The rack teeth 22 mesh with a worm gear 23 formed on the shaft 17a of a motor 17 operable in response to a signal means of a focus detecting element 31 which will be described, to thereby transmit the rotation of the motor 17 to the lens barrel 57.

The aperture ring 2 is provided with a camming grooves 2a, a cutaway portion 2b and an aperture interlocking bar 6 studded in the aperture ring 2. The aperture ring is biased in counter-clockwise direction by a spring 5 connected to a fixed pin 4. A typical aperture blade 3 has pins 3a and 3b studded therein, the pins 3a and 3b being received in the camming groove 2a and the fixing hole, respectively, so as to permit the aperture opening, defined by a blade 3 for each groove 2a, to be adjusted by manual rotation of the aperture ring 2.

The aperture setting cam ring 9, which is the the means for setting the aperture, is constituted by an element provided with an arm portion 9a and a camming surface portion 9b. The arm portion 9a is slidable only in the thrust direction with the arm portion 11a of the aperture setting ring 11 and rotatable in the radial direction with the latter ring 11. The camming surface portion 9b serves to displace a pin 8 studded in a bell crank 7 in response to the stroke of the camming surface portion 9b. When the pin 8 is displaced by the camming surface portion 9b, the bell crank 7 is rotated about its axis of rotation 7b to set the position of a pin 7a, studded in the bell crank 7, thereby controlling the displacement of the aperture blades 3 and accordingly controlling the aperture opening.

The manually operable aperture ring 10, which is provided with means for changing from manual stop-down to automatic stop-down or vice versa, has a projecting portion 10a for controlling the range over which the arm portion 9a of the aperture setting cam ring 9 is displaced in the radial direction. The projecting portion 10a is arranged for engagement with the arm portion 9a of the aperture setting cam ring 9, and when an index 59 is manually registered with a letter "A" on the manually operable aperture ring 10, the projecting portion 10a may occupy a position for maximizing the range over which the arm portion 9a of the aperture setting cam ring 9 is displaced by a later-described means, i.e., the position outside the range within which the aperture baldes 3 can form a maximum to a minimum opening.

The aperture setting ring 11 is provided with an arm portion 11a extending in opposition to the thrust direction and an arm portion 11b having a pin 11a studded therein, and is biased for counter-clockwise rotation by a spring 13 secured to said pin 11c and to fixed pin 12. The arm portion 11a is in engagement with the arm portion 9a of the aperture setting cam ring 9 and the arm portion 11b is in engagement with the pawled portion 49a of an aperture setting rack plate 49, thus transmitting to the aperture setting can ring 9 the rotational displacement of the aperture setting ring 11 caused by the displacement of the aperture setting rack plate 49 which in turn is caused by a means which will be described later.

The stop-down drive ring 14 is provided with an arm portion 14b extending in opposition to the thrust direction and an arm portion 14c having a studded pin 14a, the arm portion 14b being in engagement with the bent portion 18a of a stop-down lever 18. An aperture interlocking bar 6 is engaged with the studded pin 14a by a later-described means to actuate the aperture ring 2, and a spring 16 is extended between the studded pin 14a and a fixed pin 15 to bias the stop-down drive ring 14 for clockwise rotation.

The stop-down lever 18, which is biased for counter-clockwise rotation by a spring 20 secured to a fixed pin 19, is associated with the stop-down drive ring 14 to actuate the same into clockwise rotation by a camera's release signal means immediately before the shutter is started, thereby stopping down the aperture.

An optical system means for detecting the focus comprises the elements including the picture-taking lens 1, mirror 21, transmissive diffusing plate 24, beam splitters 25 and 32, pentaprism 59, maggnifier lens 35 and relay lens 26. A light beam passed from an object through the picture-taking lens 1 is refracted by the mirror 21 and then passed through the diffusing plate 24 and split into two beam by the beam splitter 25. One of these two beams passes through the lens 26 into a photoelectric element 31, while the other beam passes through the pentaprism 59 and is further split by the beam splitter 32 into two beams, i.e., the beam passing to a metering element 34 and the beam passing to the magnifier lens 35.

The mirror 21, which is associated with a shutter mechanism for movement therewith, is for focusing the object light beam passed through the picture-taking lens on the diffusing plate 24 disposed in conjugate relationship with the surface of a film 103 before the shutter is started, the mirror 21 being provided with means to remove it from the travel path of the incident light to the film surface to permit the object light beam passed through the picture-taking lens to be focused on the film surface once the shutter is started.

Photoelectric element 31, detector circuit 47 and control circuit 48 provide signal means constituting a control circuit for controlling the servomotor 17. The signal means is such that the signal from the photoelectric element 31 is detected by the detector circuit 47 and the control circuit 48 controls the motor 17 in accordance with the detection signal.

A diaphragm 30 is disposed between the relay lens 26 and the photoelectric element 31. The diaphragm 30 has pins 3a and 3b studded therein, which pins 3a and 3b are received in the bearing hole 27a of the aperture pin journalling ring 27 and in the camming groove 29a of the aperture ring 29.

A shutter speed setting dial 38 is provided with a gear 37 and a shaft 38a having a current collector member 60 fitted thereon. An angle of rottation of the shutter speed setting dial 38 causes the same angle of rotation of the current collector 60.

Mounted on the underside of the current collector 60 is a resistor 36 whose resistance value may be varied with the current collector.

A rack plate 56 is provided with gear portions 56a and 56b, which are respectively in mesh engagement with the gear 37 and the outer peripheral gear portion of the aperture pin journalling ring 27 so that the ring 27 and the shutter speed setting dial 38 are in cooperative relationship.

A gear 52 mounted on the shaft 39a of a servomotor 39 operable in response to the signal variation resulting from the variation in the amount of light as measured by the metering element 34 trannsmits the rotation of this servomotor to the rack plate 49 via a gear 53 and the gear portion 49b of an automatic aperture setting rack plate 49, which is vertically movable with the rotation of the servomotor 39.

A gear 55 is in mesh engagement with a gear 54 mounted on a shaft 53b coaxially with the gear 53 and also in engagement with the outer peripheral gear of the aperture ring 29 so as to transmit the rotation of the servomotor 39 to the aperture ring 29.

An exposure setting circuit for controlling the rotation of the servomotor 39 serves to provide an extent of aperture corresponding to the from-time-to-time brightness of an object and in accordance with the from-time-to-time shutter speed, and it is such that when the rotation of the servomotor 39 is transmitted via the gears 52, 53 and rack teeth 49b, the pawled portion 49a of the rack plate 49 is moved to control the extent of opening of the aperture blades 3. The exposure setting circuit comprises a bridge circuit provided by a resistance 40 selected by the shutter speed dial 38, resistances 41, 42 and the resistance of the metering element 34, a detection amplifier circuit 43 for detecting the unbalanced voltage of said bridge circuit, a voltage source stablizing circuit 44, a voltage source 45 and a main switch 46.

In operation, the camera is first made to look toward a desired target or object. When the lens barrel 57 is axially moved forward or backward by the motor 17 for proper focusing, a secondary image of the object is focused on the diffusing plate 24 through the picture-taking lens 1. The secondary image thus formed on the diffusing plate 24 is split by the beam splitter 25 into two beams, one of which is passed through the relay lens 26 to form an image on the surface of the photoelectric element 31. When a properly focused image is so formed on the surface of the photoelectric element 31, the resistance of the element 31 reaches its maximum value. The maximum signal is detected by the detector circuit 47, and the control circuit 48 controls the motor 17 in accordance with the detection signal of the detector circuit to stop the motor 17. Another secondary image obtained by the beam splitter 25 is passed through a pentaprism 59 and further split into two secondary images, i.e., the secondary image formed on the metering element 34 by the beam splitter 32 and the secondary image formed on the photographer's eye through the magnifier lens. The light beam split by the beam splitter 32 is measured by the metering element 34, which delivers a signal to the servomotor 39 to rotate the same until the bridge circuit provided by the resistance 40 selected by the shutter speed dial 38, resistances 41, 42 and the resistances of the metering element 34 is stabilized by the exposure setting circuit in which the unbalanced voltage of the bridge circuit is detected by the detector circuit 43.

The rotation of the servomotor is transmitted via the gears 52, 53 and rack teeth 49b to the rack plate 49, whose pawled portion 49a is thus displaced vertically. The displacement of the pawled portion 49a of the rack plate 49 is transmitted via the main elements such as aperture setting ring 11, aperture setting cam ring 9 and aperture ring 2 to control the extent of the aperture opening defined by the aperture blades 3 of the picture-taking lens 1. On the other hand, the rotation of the servomotor caused by the signal from the exposure setting circuit is transmitted via the gears 54, 55 to rotate the aperture ring 29 to open and close the aperture 30, thus maintaining the intensity of illumination on the surface of the photoelectric element 31 and therefore the resistance thereof substantially at a predetermined value.

This means that if the brightness of the object is constant there will be provided a constant f-value for a constant film sensitivity and a constant shutter speed. For example, if the shutter speed is changed from 1/60 second to 1/125 ssecond by rotating the shutter speed dial 38, then the resistance 40 will of course reduce its value so that the unbalanced voltage of the circuit will provide the servomotor 39 with a signal of the sense for opening the aperture over one step, thus rotating the servomotor 39 in the direction for opening the aperture. Therefore, the aperture 30 is opened over one step. On the other hand, the rotation of the shutter speed dial 38 is transmitted via the gear 37 and the rack teeth 56a, 56b of the rack plate 56 to the aperture pin journalling ring 27, which in turn imparts rotation to the aperture blade pin 30a for stopping down the aperture over one step. Thus, the brightness on the surface of the photoelectric element 31 is independent of the film sensitivity and shutter speed but only dependent of the from-time-to-time brightness of the object.

The movement of the pawled portion of the rack plate 49 imparts rotation to the aperture setting ring 11 and then to the aperture setting cam ring 9, so that the camming surface 9b of the cam ring 9 varies its stroke and the pin 8 follows such variation of the stroke to thereby rotate the bell crank 7 so as to set the position of the pin 7a.

Depression of a release button moves the mirror 21 upwardly and at the same time, the stop-down lever 18 is rotated clockwise against the force of the spring 20, whereby the stop-down drive ring 14 is rotated counter-clockwise against the force of the spring 16. The rotation of the stop-down drive ring 14 causes the pin 14a to be retracted so as to permit the aperture ring 2 to be rotated counter-clockwise by the force of the spring 5 through the aperture interlocking bar 6 until the cutaway portion 26 strikes against the pin 7a, whereupon the rotation is stopped and the opening of the aperture blades 3 is determined.

When the manually operable aperture ring 10 is manually rotated from the "A" position to any desired f-value position, the main switch 46 for the exposure setting circuit is opened in response thereto, thus deenergizing the circuit.

When the manually operable aperture ring 10 is rotated clockwise from the "A"position, the projected 10a is engaged with the aperture setting ring 11 to rotate the latter ring 11 and further rotate the aperture setting cam ring 9 and the bell crank 7 to thereby set the pin 7a to a desired aperture position. At the same time, the rotation of the aperture setting ring 11 is transmitted via the automatic setting rack plate 49 and gears 53, 54, 55 to rotate the aperture ring 29 so as to determine a desired aperture opening.

Where it is desired to effect an automatic focus detection by detecting the image formed on the secondary image plane by the light passed through the picture-taking lens 1, the intensity of illumination on the surface of the detector element may be varied with the environmental conditions as well as with the focal distance and F-number of the picturre-taking lens or a different transmittivity of the diffusing plate in use. Taking only the focus-determining component out of such complex variation would involve difficulties in relation to the construction of the amplifier therefor, if the variation is of great magnitude, and thus the accuracy of the focus detection would be reduced. This problem may be solved by the present invention in that the intensity of illumination on the surface of the focus detector element is always controlled to a substantially constant value by the output of the metering element disposed in the optical path of the focus detector located rearwardly of the secondary image plane which is in conjugate relationship with the film surface, whereby any irrelevant components of the complex variation may be removed to enhance the accuracy of the focus detection.

According to the present invention, as will be appreciated from the foregoing description, the amount of light received by the focusing light receiving element may be maintained constant by the light control means such as stop or the like, so as to be independent of the brightness of the object to be photographed, i.e., the electrical output of the light receiving element may be maintained at a predetermined level for any and every object. This leads to a simple circuit arrangement for effecting the electrical treatment required during the focusing. In addition, since the light receiving element is located in conjugate relationship with the secondary real image plane formed by the picture-taking or objective lens with respect to the focusing lens, it is possible to employ the viewfinder system of the conventional single lens reflex camera or the like without specifically modifying it and additionally provide a focusing lens, a stop and a light receiving element to thereby provide an essential reform for the camera and enable such conventional camera to readily incorporate the focusing unit. Moreover, since the stop mechanism disposed forwardly of the focus detector element is controlled in response to movement of the picture-taking lens aperture ring driven by the signal from the exposure setting circuit or of the aperture setting ring used for the automatic stop-down, the mechanism for controlling the intensity of illumination on the surface of the focus detector element is simplified in construction and the accuracy of such mechanism may be equivalent to that of the picture-taking lens aperture mechanism. Further, the said mechanism for controlling the intensity of illumination on the surface of the focus detector element may also be controlled by manually operating the manually operable aperture ring which is the manually operable drive member for the aperture setting ring.

While the present invention has been shown and described with respect to some specific embodiments thereof, it is to be understood that the invention is not limited thereto but various modifications or changes may be made in the details of the shown embodiments without departing from the scope of the invention as defined in the appended claims.

We claim:

1. A single lens reflex camera having a photometric detector comprising in combination,
   a. a photographing objective with an aperture means having a fully opened and a stopped down condition;
   b. disphragm presetting means for controlling said aperture means;
   c. a photoelectric element receiving light coming through said photographing objective at its fully opened aperture condition and producing a signal in response to an object to be photographed;
   d. focus detector means including a photo-detector which receives light coming through said photographing objective at its fully opened aperture condition and through an auxiliary aperture means disposed between said photographing objective and the photo-detector along the path of said light;
   e. control means receiving the signal from said photoelectric element to control said auxiliary aperture means as well as said diaphragm presetting means; and
   f. a focus adjusting means for positioning said photographing objective at a position in which said focus detector means distinguishes a focused condition.

2. A single lens reflex camera according to claim 1, in which said focus detector means is of contrast-dependent characteristic.

3. A single lens reflex camera according to claim 1, wherein said focus adjusting means comprises an electric drive circuit responsive to electric signals produced by said photo-detector of said focus detector means.

* * * * *